United States Patent [19]

Callahan

[11] Patent Number: 4,575,750

[45] Date of Patent: Mar. 11, 1986

[54] COMMUNICATIONS APPARATUS FOR USE WITH CABLE TELEVISION SYSTEMS

[76] Inventor: Marty Callahan, Box 117, Greeley, Nebr. 68842

[21] Appl. No.: 615,986

[22] Filed: May 31, 1984

[51] Int. Cl.⁴ .......................... H04B 7/00; H04N 7/10
[52] U.S. Cl. .................... 358/86; 179/5 R; 455/4
[58] Field of Search .......................... 358/86; 455/3, 4; 179/2 A, 5 R, 5 P

[56] References Cited

U.S. PATENT DOCUMENTS

| | | | |
|---|---|---|---|
| 3,035,251 | 5/1962 | Inderwiesen | 340/171 |
| 3,848,193 | 11/1974 | Martin et al. | 455/3 X |
| 3,860,746 | 1/1975 | Takeuchi | 358/86 |
| 3,932,858 | 1/1976 | Smith et al. | 340/280 |
| 3,975,583 | 8/1976 | Meadows | 358/86 X |
| 3,993,955 | 11/1976 | Belcher et al. | 358/86 X |
| 4,015,074 | 3/1977 | Inoue et al. | 358/86 |
| 4,057,829 | 11/1977 | Moorehead | 358/86 |
| 4,075,628 | 2/1978 | Masuda et al. | 358/86 X |
| 4,367,548 | 1/1983 | Cotten, Jr. et al. | 358/86 X |
| 4,415,771 | 11/1983 | Martinez . | |
| 4,476,488 | 10/1984 | Merrell | 358/86 |

FOREIGN PATENT DOCUMENTS

| | | | |
|---|---|---|---|
| 55-147048 | 11/1980 | Japan | 455/3 |
| 56-72550 | 6/1981 | Japan | 358/86 |
| WO84/01873 | 5/1984 | PCT Int'l Appl. | 358/86 |

Primary Examiner—Keith E. George
Attorney, Agent, or Firm—Henderson & Sturm

[57] ABSTRACT

A cable television system communications apparatus comprising a transmission unit for originating various messages and message class identification signals and a receiver unit for receiving such signals and for rendering audible such messages as are authorized for that particular receiver unit.

7 Claims, 5 Drawing Figures

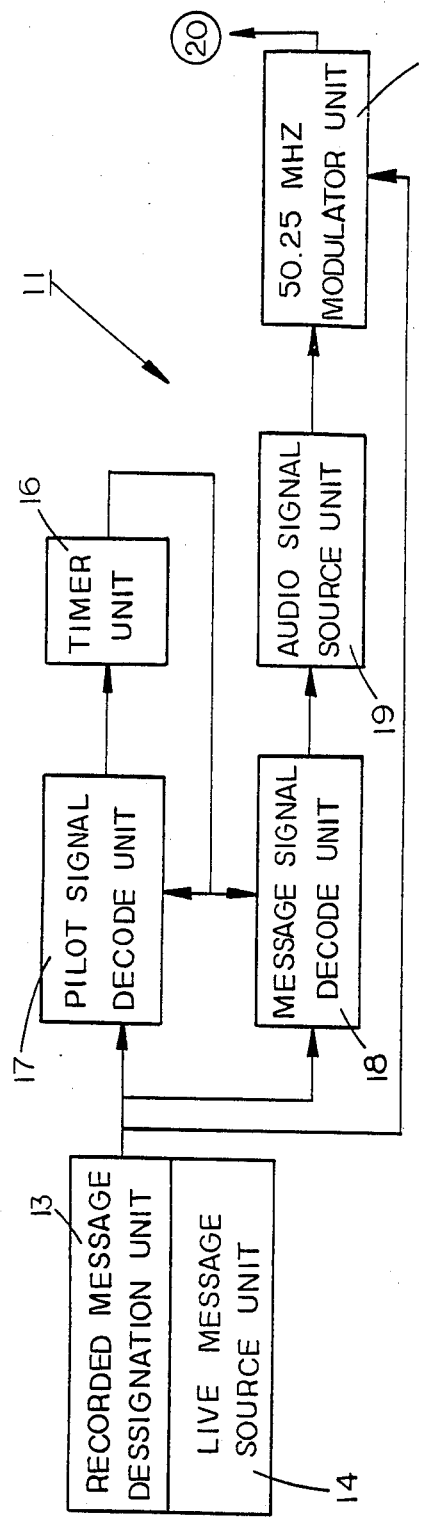
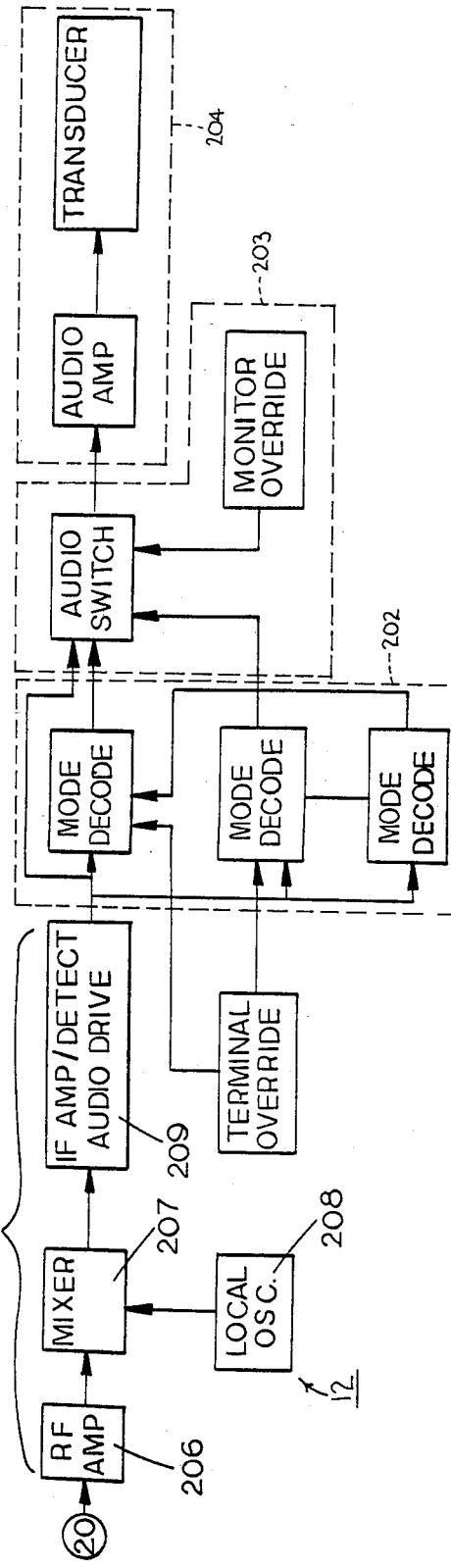
FIG. 1A
FIG. 1B

COMMUNICATIONS APPARATUS FOR USE WITH CABLE TELEVISION SYSTEMS

TECHNICAL FIELD

This invention relates generally to communications apparatus and more particularly to communications apparatus for transmitting and receiving audio messages through a cable television system.

BACKGROUND ART

Cable television systems are well known in the art. Through such systems, a recipient's television receiver may be connected to a cable that connects to the cable company's transmitter. A plurality of television signals are broadcast in the radio frequency range through the cable.

Attempts have been made to send additional messages through such cable systems. For instance, in some prior art systems, a written message appears on the screen of the recipient's receiver. This message may either contain all of the pertinent information that the cable company intends the recipient to receive, or it will instruct the viewer to turn to a specific channel. The intended information will then be viewable on that channel.

Such a system has certain obvious drawbacks. Perhaps foremost, the receiver must actually be on. If not, the intended recipient will not be aware that the cable company has transmitted a message.

Because of such drawbacks, a cable systems have not been particularly exploited in this regard. Nevertheless, there exist many intances when such a message carrying capacity could be well utilized.

For instance, such a system could be used to deliver severe weather warnings to all subscribers in a threatened area. Civil defense messages or environmental health warnings could be similarly delivered.

Other types of messages could be delivered as well. For instance, members of a volunteer fire department could be alerted to the existence of a condition requiring their skills.

The prior art systems are ill-suited for these purposes because they require that the recipient's television receiver be on, and also because they include no means to limit the audience that may receive the message. There exists a need for a communications system suitable for use with a cable television system that will operate even when the recipient's television receiver is deactivated. Such a system should be capable of decoding certain transmission data to thereby allow appropriate messages to be delivered to the intended audience and inappropriate messages to be silenced. Furthermore, such a system should insure termination of the message mode when the message has been completed, a recipient should be able to selectively monitor the message channels if desired and a recipient should be able to terminate a particular message if desired.

DISCLOSURE OF THE INVENTION

The above needs are substantially met by provision of the instant invention. The invention includes generally a transmission unit and a receiver unit.

The transmission unit includes an audio signal source unit for providing at least one audio signal message, this audio signal source unit preferably including a recorded message designation unit and a live message source unit. The transmission unit also includes a pilot signal decode unit, a timer unit, a message signal decode unit, an audio signal source unit and a modulator unit.

The recorded message designation unit may be comprised of a plurality of discrete switches that operate to generate dual tone signals which in turn are amplified and provided to the pilot signal decode unit and message signal decode unit. The live message source unit provides a means of directly connecting a microphone and amplifier unit to the modulator unit for subsequent broadcast to the receiver unit.

The pilot signal decode unit comprises a tone decoder that monitors in-coming signals for a trigger signal. When this signal has been received, the pilot signal decode unit activates the timer unit. The timer unit will then operate for a pre-selected period of time before terminating. Upon terminating, it will deactivate both the pilot signal decode unit and the message signal decode unit.

The message signal decode unit includes a plurality of decoders that monitor the incoming signals for their own particular discrete trigger frequency. When a trigger signal is received by one of these decoders, the audio signal source unit will be activated such that a recorded message will be transmitted to the modulator unit, which then broadcasts the signal to the receiver unit.

The receiver unit includes a radio frequency amplifier to increase the transmitted signal and a mixer and demodulator unit to reconvert the sub-carrier frequency into an audio signal.

A plurality of message class decode units then determine, by analysis of the incoming audio frequency, which discrete signal source the signal originated from. If the incoming message is appropriate for the intended recipient, one of the message class decode units will be sensitive to it and will operate to initiate a switch unit that will allow the message to pass through the audio transducer unit to render the message audible.

At the conclusion of the message, one of the message class decode unit components will detect a termination signal and will shut the switch unit off to terminate the signal. The invention also provides for a mode decode unit override switch to allow any broadcast to be rendered audible, and another switch that will allow a recipient to terminate any broadcast, though without inhibiting the reception of any future broadcasts.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein:

FIGS. 1a–b comprises a block diagram of the communications apparatus;

BEST MODE FOR CARRYING OUT THE INVENTION

Figure 2A:
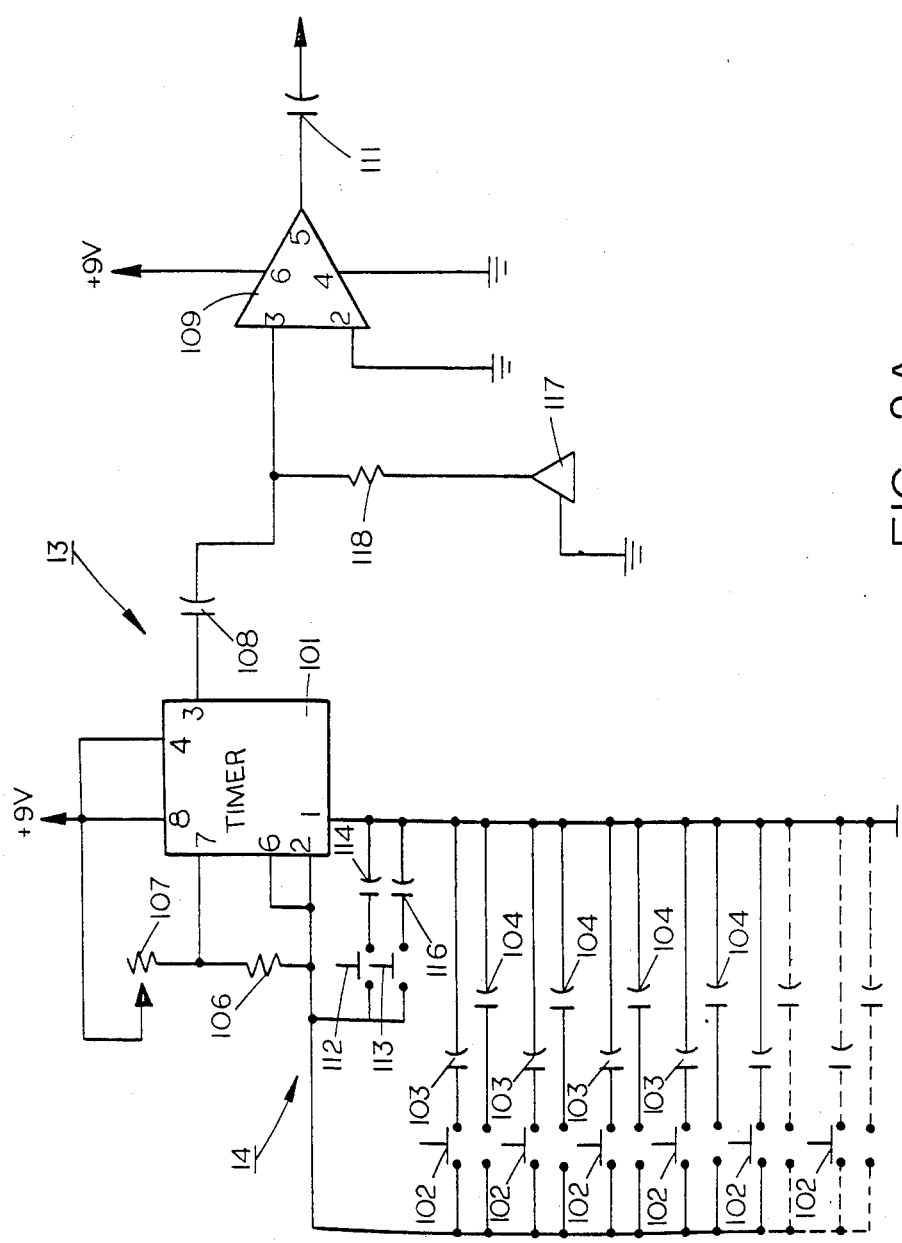
FIGS. 2a–b comprises a schematic diagram of the transmission unit.

Referring now to the drawings, and in particular to FIGS. 1a–b, the apparatus may be seen as depicted generally in block diagram form. The apparatus includes generally a transmission unit (11) and a receiver unit (12).

The transmission unit (11) includes generally a recorded message designation unit (13), a live message source unit (14), a timer unit (16), a pilot signal decode unit (17), a message signal decode unit (18), an audio signal source unit (19) and a modulator unit (21). Each of these units will now be described in greater detail.

The recorded message designation unit (13) and the live message source unit (14) will be described with reference to FIG. 2a. Both units (13 and 14) are structured about an LM555 timer. The trigger port (pin 2) of the timer (101) connects to a plurality of switches (102), the opposing poles of which connect through first and second capacitors (103 and 104) to ground. The values of the first and second capacitors (103 and 104) are selected to obtain the desired output frequency. As configured, the closure of any one of the switches (102) will result in a dual tone signal being emitted from the output (pin 3) of the timer (101).

A 1k ohm resistor (106) connects between the trigger port (pin 2) of the timer (101) and the discharge port (pin 7) thereof. One leg of a 500k ohm variable resistor (107) connects to the discharge port (pin 7), and the variable leg thereof connects to a positive 9 volt source. In addition, the $V_{cc}$ port (pin 8) and the reset port (pin 4) of the timer (101) also connect to the positive 9 volt source. The ground port (pin 1) connects to ground and the threshold port (pin 6) connects to the trigger port (pin 2).

The output port (pin 3) of the timer (101) connects through a 0.01 micro farad capacitor (108) to the non-inverting input port (pin 3) of an LM386 power amplifier (109). The inverting input (pin 2) of this power amplifier (109) connects to ground, as does the ground port (pin 4). The $V_{cc}$ port (pin 6) connects to a positive 9 volt source and the output port (pin 5) connects through a 0.01 micro farad capacitor (111) to a dedicated phone line or other path of transmission as may be selected to connect the recorded message designation unit (13) and the live message source unit (14) to the pilot signal decode unit (17) and the message signal decode unit (18).

The live message source unit (14) has also been constructed about the timer (101), and further includes two switches (112 and 113). The first switch (112) has one pole connected to the trigger port (pin 2) of the timer (101) and the remaining pole connected through a capacitor (114) to ground. The second switch (113) has one pole connected to the trigger port (pin 2) of the timer (101) as well, and its remaining pole connects through another capacitor (116) to ground. The values of these capacitors (114 and 116) can be chosen as desired in order to create the desired single tone output signal from the timer (101).

The live message source unit (14) also includes a microphone (117), the output of which may be connected through a 1k ohm resistor (118) to the non-inverting input (pin 3) of the power amplifier (109).

Figure 2B:
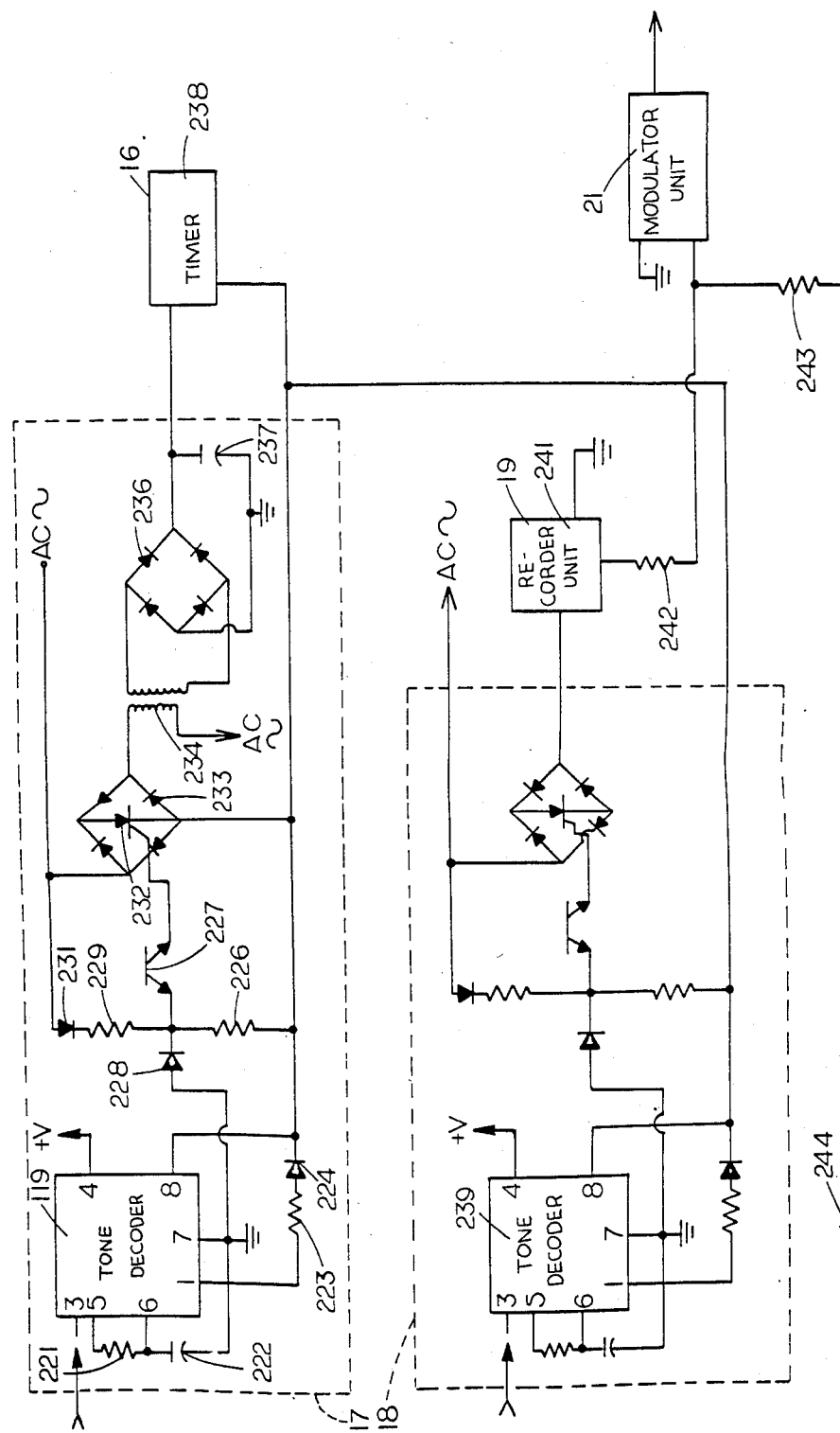

Referring to FIG. 2b, the pilot signal decode unit (17) includes a 567 tone decoder (119) that has its input port (pin 3) connected to the incoming signal from the recorded message designation unit (13) and the live message source unit (14). The $V_{cc}$ port (pin 4) of this decoder (119) connects to a positive nine volt source. The timing resistor port (pin 5) connects through a resistor (221) to the timing capacitor port (pin 6), which port connects through a capacitor (222) to ground. This resistor (221) and capacitor (222) may be selected to obtain the frequency desired. The ground port (pin 7) connects to ground. The output capacitor port (pin 1) connects through a 22k ohm resistor (223) to the anode side of a diode (224) such as a 1N914. The cathode side of this diode (224) connects to the output port (pin 8) of the decoder (119).

The output port (pin 8) of the decoder (119) also connects through a 100 ohm resistor (226) to a diac (227) such as a GEST2. The diac (227) connects to the cathode side of a grounded diode (228), and also through a series connected 10k ohm resistor (229) and diode (231) to an alternating current source of power.

The remaining port of the diac (227) connects to the triggering gate of a silicon controlled rectifier (232) such as a GEC36-D. This silicon controlled rectifier (232) connects across a bridge rectifier (233), the input node of which connects to the alternating current power source, and the output node of which connects to the input terminal of a power transformer (234) such as a Stancor 110 volt to 12 volt transformer.

The remaining terminal of the primary winding of this transformer (234) connects to the remaining port of the alternating current power supply. The secondary windings of the transformer (234) are connected across a second bridge rectifier (236), the outputs of which are connected through 100 micro farad filtering capacitor (237) to a second LM555 timer (238) that comprises the timer unit (16) of the transmission unit (11).

The remaining external biasing components (not shown) for the timer (238) may be selected as desired in conformance with well known practice in order to obtain a desired time delay. The output of this timer (238) then connects to the output port of each tone decoder unit described above and below with respect to the transmission unit (11) and operatively to the output capacitor port (pin 1) of each tone decoder unit described above and below with respect to the transmission unit (11).

The message signal decode unit (18) includes a 567 tone decoder (239) configured as described above with respect to the pilot signal decoder unit tone decoder (119). This being the case, no additional description need be made here except to note that a plurality of such tone decoders may be provided as necessary in order to accomodate the desired number of discrete alarm sources.

As with the tone decoder, the message signal decode unit (18) also includes additional components that are identical to those described above with respect to the pilot signal decode unit (17), with the exception that the message signal decode unit (18) does not include a power transformer or second bridge rectifier. This being the case, no detailed description will be provided here of the components or configuration since these have already been described in detail above.

The output of the first bridge rectifier in the message signal decode unit (18) connects to the power input of a selected recorder unit (241), which recorder unit (241) comprises the audio signal source unit (19). The audio output port of the recorder (241) connects through a 1k ohm resistor (242) to the input port of the modulator unit (21) (as provided through use of a Catel or ATV Research TVMX 100 series 50.25 megahertz modulator). The input of this modulator unit (21) also connects through a 1k ohm resistor (243) and a 0.01 micro farad capacitor (244) to the incoming signal from the live message source unit (14). The output of the modulator unit (21) may then be connected to the cable system (20)

as shown in FIG. 1A such that the signal transmitted thereby may be transmitted to the receiver unit (12).

Referring back to FIG. 1b, the receiver unit (12) includes generally a demodulator unit (201), a message class decode unit (202), a switch unit (203) and an audio transducer unit (204). With continued reference to FIG. 1b, the demodulator unit (201) may be comprised of a radio frequency amplifier (206), a mixer (207), a local oscillator (208) and an IF amplifier/detector and audio drive unit (209).

Figure 3:
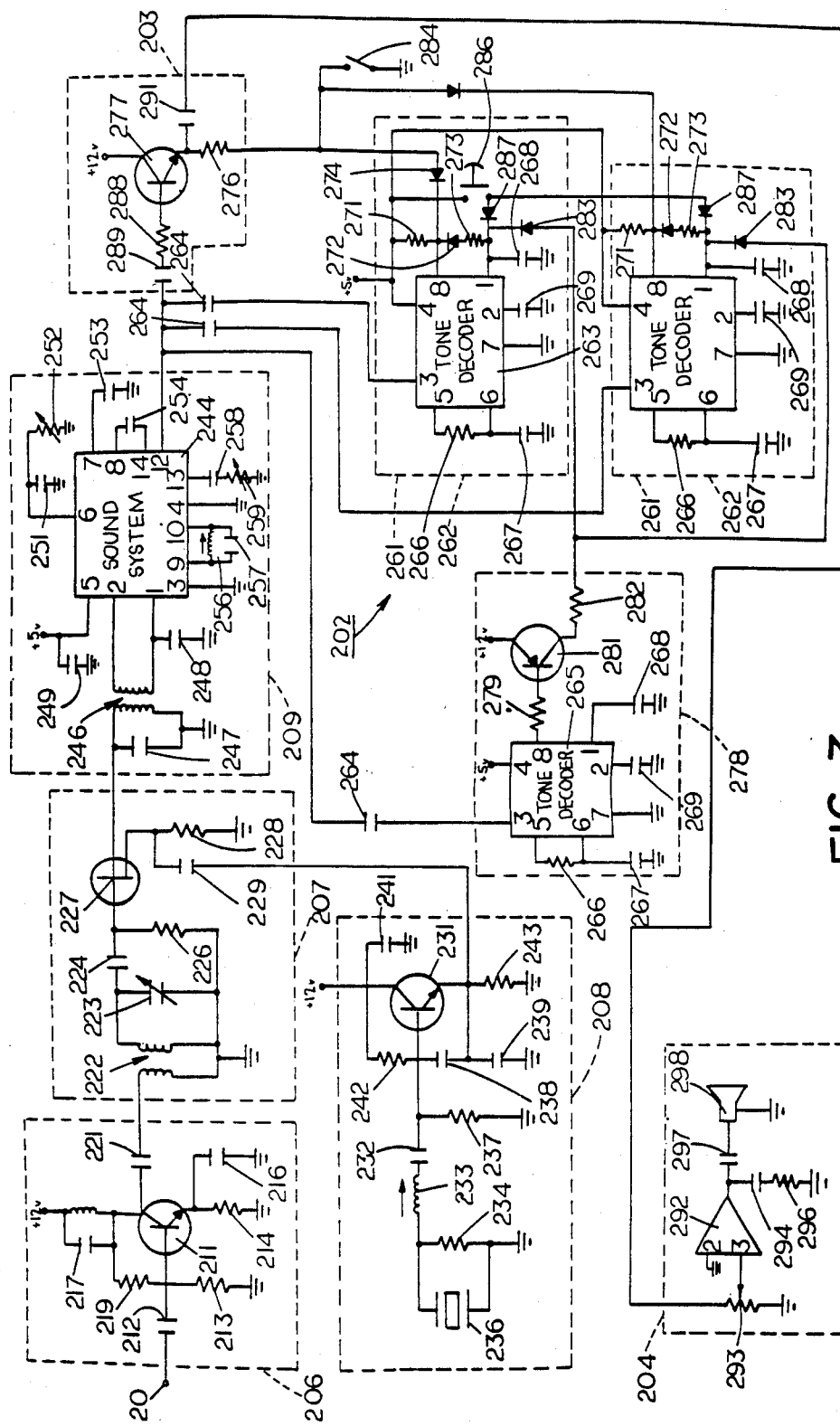
FIG. 3 comprises a schematic diagram of the receiver unit.

Referring to FIG. 3, the radio frequency amplifier (206) may be constructed about a 2N4013 transistor (211). The base of this transistor (211) connects through a 0.01 micro farad coupling capacitor (212) to the cable system (20), and also through a 3.6k ohm resistor (213) to ground. The emitter of this transistor (211) connects through a parallel connected 1k ohm resistor (214) and 0.01 micro farad capacitor (216) to ground. The collector connects through a 50.25 mega hertz pretuned resonant circuit (217) to a positive 12 volt source, and also through a 6.2k ohm resistor (219) to the base thereof. Finally, the collector connects through a 0.01 coupling capacitor (221) to the mixer (207).

The mixer (207) has a transformer isolated input port (222). A 5 to 30 pico farad variable capacitor (223) connects in parallel across this input. The input then connects through a 5 pico farad capacitor (224) and 1M ohm resistor (226) network to the gate of a 2N4416 FET transistor (227).

The source of this transistor (227) connects through a 1k ohm resistor (228) to ground and through a 5 pico farad capacitor (229) to the local oscillator (208) described below. The drain connects to the IF amplifier/detector and audio drive unit (209) described below.

The local oscillator (208) includes a 2N5126 transistor (231). The base of this transistor (231) connects through a parallel connected 100 pico farad capacitor (232) and 1 micro Henry variable inductor (233) to a parallel connected 560 ohm resistor (234) and a 18.25 mega hertz crystal (236), the remaining terminals of which connect to ground. The base of the transistor (231) also connect through a 5.6k ohm resistor (237) to ground, and through a 100 pico farad capacitor (238) to the mixer unit (207) as described above and also through a 68 pico farad capacitor (239) to ground.

The collector of the transistor (231) connects in a positive 12 volt source, and a grounded 0.001 micro farad capacitor (241), and through a 15k ohm resistor (242) to the base thereof. The emitter of the transistor (231) connects through a 470 ohm resistor (243) to ground and to the mixer unit (207) as described above.

The IF amplifier/detector and audio drive unit (209) includes primarily part number ECG712TV/FM sound system (244) as manufactured by Sylvania. This part consists of a multi-stage limiting IF amplifier, a DC gain control, an FM detector and an audio driver.

The two input ports (pins 1 and 2) of the sound system (244) connect through an isolation transformer (246) and through a parallel connected 47 pico farad 4.5 mega hertz tuned coupling transformer grounded capacitor (247) to the mixer unit (207). In addition, pin 1 also connects through a 0.05 micro farad capacitor (248) to ground.

The power supply port (pin 5) of the sound system (244) connects to a positive 5 volt source and also through a 0.047 micro farad capacitor (249) to ground.

The DC volume control port (pin 6) connects through a 0.05 micro farad capacitor (251) to ground and through a 200k ohm volume control variable resistor (252) to ground. The deemphasis port (pin 7) connects through a 0.01 micro farad capacitor (253) to ground. The detector output and the audio input pins (pin 8 and 14, respectively) are connected together by a 0.047 micro farad capacitor (254).

The ground port (pin 3) of the sound system (244) connects directly to ground. The quad detector ports (pins 9 and 10) are connected together by a parallel connected 16 micro Henry variable inductor (256) and a 68 pico farad capacitor (257). The remaining ground port (pin 4) connects to ground, and the tone control port (pin 13) connects through a series connected 0.3 micro farad capacitor (258) and a 25k ohm tone control variable resistor (259) to ground. The audio output port (pin 12) connects to the message class decode unit (202).

The message class decode unit (202) includes a plurality of mode decode units (261). Two of the mode decode units are identical and are further denoted by the numeral (262). Since they are identical, only one of these mode decode units (262) will be described in detail.

All of the mode decode units (261) include a part number 567 phase locked loop as manufactured by National Semiconductor. This part comprises a tone decoder having an output that goes low when the input frequency matches the part center frequency. The center frequency may be determined by the values of the timing resistor and capacitor as indicated below. The timing resistor may assume any value between 2k and 20k ohms. Such a part can be adjusted to detect any input frequency between 0.01 hertz and 500 kilo hertz. For appropriate operation, the output capacitor should have about twice the capacitance of the low pass filter capacitor.

The input port (pin 3) of the tone decoder (263) connect through 0.01 micro farad capacitors (264) to the audio output of the IF amplifier/detector and audio drive unit (209). The volted source port (pin 4) of each tone decoder (263) connects to an appropriate positive 12 volt source.

A timing resistor (266) connects between the timing resistor port (pin 5) and the timing capacitor port (pin 6). A timing capacitor (267) connects between the timing capacitor port (pin 6) and ground. An output capacitor (268) connects to the output capacitor port (pin 1). A low pass capacitor (269) connects to the low pass capacitor port (pin 1). The ground port (pin 7) connects to ground.

Again, the value of the above components are chosen as appropriate for the detection of a particular frequency.

The plurality of identical mode decode units (262) have a 4.4k ohm resistor (271) connected between the output port (pin 8) of each tone decoder (263) and the positive 12 volt voltage source. The output port (pin 8) also connects to the cathode side of a diode (272), the anode side of which connects through a 22k ohm resistor (273) that connects to the output capacitor port (pin 1). The output port (pin 8) then connects to the cathode side of another diode (274), the anode sides of which connect through a 470 ohm resistor (276) to the emitter of a 2N2222 transistor (277) in the switch unit (203).

The remaining mode decode unit (278) comprises a message terminated mode decode unit. The output port (pin 8) of this tone decoder (265) connects through a 1k ohm resistor (279) to the base of a 2N3638 transistor (281). The emitter of this transistor (281) connects to a positive 12 volt source and the collector connects through a 1k ohm resistor (282) to the anode side of a plurality of diodes (283), the cathode sides of which each connect to one output capacitor port (pin 1) of each remaining mode decode tone decoder (263).

Two operator controlled switches are additionally provided in the message class decode unit (202). The first switch comprises a monitor switch (284). One terminal of this switch connects to ground, and the remaining terminal connects to the resistor (276) that connects to the emitter of the switch transistor (277) in the switch unit (203).

The remaining switch comprises an operator controlled message terminate switch (286). This switch (286) may be comprised of a normally open push button switch having one terminal connected to the positive 12 volt source, and the remaining terminal connected to the anode side of a plurality of diodes (287), the cathode sides of which each connect to the output capacitor port (pin 1) of each identical mode decode unit (262).

The switch unit (203) includes a transistor (277) as indicated above. The collector of this transistor (277) connects to the positive 12 volt source. The base of this transistor (277) connects through a 18k ohm resistor (288) and 0.01 micro farad capacitor (289) to the audio output of the IF amplifier/detector and audio drive unit (209). The emitter of this transistor (277) connects through a 10 micro farad capacitor (291) to the audio transducer unit (204).

The audio transducer unit (204) may be configured about an LM386 power amplifier (292). The audio input from the switch unit (203) connects through a 10k ohm variable resistor (293) to the non-inverting input port (pin 3) of the power amplifier (292). The inverting input (pin 2) thereof connects to ground. The output of the power amplifier (292) connects through a series connected 0.05 micro farad capacitor (294) and 10 ohm resistor (296) to ground, and through a 250 micro farad capacitor (297) to an 8 ohm speaker (298).

Having described in detail the parts and configuration thereof that comprise the transmission unit (11) and the receiver unit (12), operation of the apparatus will now be described.

Very simply stated, an operator may close any of the switches of the recorded message designation unit (13) to cause a specific dual tone signal to be emitted thereby. One such signal will activate the pilot signal decode unit (17) and thereby activate the timer unit (16). The message signal decode unit (18) then determines which signal has been sent, and activate the appropriate audio signal source.

By the above scheme, a switch for severe weather warnings can be closed to activate a recording regarding such a severe weather warning. Another switch for notification of a fire can be closed to activate a recorded message regarding such fire. Yet another switch can be closed that activates an amplifier to allow the broadcast of a live transmission. The timer unit (16) ensures that such messages are terminated at an appropriate time.

The modulator unit (21) then converts the audio signal into a radio frequency signal and combines it with the primary broadcast signals to introduce them into the cable television system (20).

To transmit a live message, the operator would close the first switch (112) of the live message source unit (14), and speak into the microphone (117). The identifying tone created by closing this switch (112) would be directly transmitted by the modulator (21) and received by the receiver unit (12), where it would be decoded and the appropriate circuitry enabled such that the live broadcast would be rendered audible. When the message has been concluded, the operator would terminate the broadcast by closing the second switch (113). The tone issued by this second switch would then de-enable the receiver unit (12).

The signal travels through the cable television system (20) until it reaches the receiver unit (12). The receiver unit operates to receive this signal regardless of whether the television receiver in the recipient's home has been activated.

The demodulator unit (201) serves to receive the signal and reconvert it to an audio signal. The message class decode unit (202) then monitors this signal for the initial activating tones. If that tone matches the center frequency of any of the mode decode units (261), that mode decode unit will activate the switch unit (203) to allow the audio signal to pass therethrough to the audio transducer unit (204). If, however, the broadcast frequency does not match the center frequency of any of the mode decode units (261), the switch unit will not be activated and the signal will not be rendered audible in that particular recipient's home.

It will therefore be appreciated that members of a volunteer fire department, for instance, could have a mode decode unit (261) installed in their receiver units (12) that monitored for a fire alarm. Other persons having no need of such information would not have such a mode decode unit and would not be alerted to such messages.

The operator controlled monitor switch (284) allows an operator to close the switch unit (203) and render all broadcast messages audible. The operator controlled message terminate switch allows an operator to terminate any message prior to its conclusion. It will not operate to squelch future message, however.

When the message has been completed, a message terminate signal will be broadcast by the transmission unit (11) and sensed by the message terminated mode decode unit (278). This unit will then activate the transistor (281) associated therewith to reset the mode decode units (262) and thereby open the switch unit (203).

Any number of mode decode units (261) could be provided as appropriate in an individual circumstance.

Obviously, numerous modifications and variations of the present invention are possible in light of the above teachings. For instance, instead of verbal messages, a simple alarm tone could be broadcast as the audio signal message without departing from the spirit of the invention. It is therefore to be understood that within the scope of the appended claims, the invention may be practiced otherwise than as specifically described therein.

I claim:

1. A communications apparatus for use with a cable television system, the apparatus comprising:
 (a) transmission means for originating a message and transmitting said message through at least a portion of said cable television system, said transmission means including:
  (i) audio signal source means for providing at least one audio signal message to serve as the originated message wherein said audio signal message comprises at least one recorded message;

(ii) modulator means for receiving said audio signal message and for converting said audio signal message into a radio frequency signal that may be broadcast through said cable television system without interferring with any signals ordinarily broadcast therethrough;

(iii) recorded message designation means for generating a code signal that designates a particular recorded message that is to be transmitted by said transmission means through said cable television systems; and (iv) message signal decode means for receiving said coded signal from said recorded message designation means to at least partially decode said coded signal and for generating an enable signal in response thereto; wherein said audio signal source means is responsive to said message signal decode means such that said enable signal from said message signal decode means will cause said audio signal source means to provide a particular recorded message as designated by said recorded message designation means; and (b) receiver means for receiving said radio frequency signal and for rendering said audio signal message audible, said receiver means including:

(i) demodulation means for receiving said radio frequency signal and for converting said radio frequency signal into an audio frequency signal; and (ii) transducer means for rendering said audio frequency signal audible without use of any transducer elements that are otherwise ordinarily connected to said cable television system, such as television speakers.

2. The apparatus of claim 1 wherein said receiver means includes message class decode means for receiving said audio freqency signal and for decoding at least a portion of said audio frequency signal and for selectively generating an enabling signal in response thereto to enable said transducer means.

3. The apparatus of claim 2 wherein said receiver means includes:

(A) switch means operably responsive to said message class decode means for rendering said audio frequency signal audible in response to appropriate signals from said message class decode means; and (B) override switch means such that said message class decode means can be selectively overridden to allow any message transmitted by said transmission means to be rendered audible by said receiver means.

4. The apparatus of claim 1 wherein said transmission means includes timer means for disabling said transmission of a recorded message upon the expiration of a preselected time period.

5. The apparatus of claim 4 wherein said transmission means further includes pilot signal decoder means for receiving said coded signal from said recorded message designation means and for at least partially decoding said signal to selectively activate said timer means in response thereto.

6. The apparatus of claim 1 wherein said transmission means further includes live message source means for selectively allowing a live broadcast to be transmitted through said transmission means.

7. The apparatus of claim 6 wherein:

(A) said transmission means includes timer means for disabling said transmission of a recorded message upon the expiration of a preselected time period; and (B) live message by-pass means for allowing a live broadcast to be transmitted from said transmission unit without activating said timer means.

* * * * *